US008630950B2

(12) United States Patent
Saegert et al.

(10) Patent No.: US 8,630,950 B2
(45) Date of Patent: Jan. 14, 2014

(54) METHOD AND DEVICE FOR DEPOSITING CHECKS

(75) Inventors: Ralf Saegert, Borchen (DE); Heinz Werner Muenstermann, Wuennenberg (DE); Thomas Maiwald, Bueren Wewelsburg (DE)

(73) Assignee: Wincor Nixdorf International GmbH (DE)

( * ) Notice: Subject to any disclaimer, the term of this patent is extended or adjusted under 35 U.S.C. 154(b) by 111 days.

(21) Appl. No.: 13/143,876

(22) PCT Filed: Jan. 12, 2010

(86) PCT No.: PCT/EP2010/050258
§ 371 (c)(1),
(2), (4) Date: Jul. 8, 2011

(87) PCT Pub. No.: WO2010/081793
PCT Pub. Date: Jul. 22, 2010

(65) Prior Publication Data
US 2011/0276483 A1 Nov. 10, 2011

(30) Foreign Application Priority Data

Jan. 14, 2009 (EP) .................................... 09150566

(51) Int. Cl.
*G06Q 40/00* (2012.01)
(52) U.S. Cl.
USPC .................. 705/43; 705/35; 705/30; 705/75; 705/1.1; 705/14.13
(58) Field of Classification Search
USPC ................. 705/1.1, 43, 35, 30, 40, 14.13, 75; 709/219; 235/380, 379
See application file for complete search history.

(56) References Cited

U.S. PATENT DOCUMENTS

2003/0217005 A1* 11/2003 Drummond et al. ............ 705/43
2005/0071283 A1 3/2005 Randle et al.
(Continued)

FOREIGN PATENT DOCUMENTS

| EP | 1 473 631 A2 | 11/2004 | |
|---|---|---|---|
| EP | 1473631 A2 * | 11/2004 | ............... G06F 9/46 |
| WO | WO 99/11021 | 3/1999 | |

OTHER PUBLICATIONS

Brittenham, Peter:"Understanding WSDL in a UDDI registry, Part 1" Internet Citation [Online XP002270029; retrieved on Feb. 12, 2004.*
(Continued)

*Primary Examiner* — John H Holly
(74) *Attorney, Agent, or Firm* — Harness, Dickey & Pierce, P.L.C.

(57) ABSTRACT

A system and method for depositing and processing checks using an ATM is provided. The method includes capturing the image data of the check with a reading unit, transmitting the image data to a web service based on an open API (Application Programming Interface) without resorting to standard protocols of ATMs. The method also includes processing the image data with the web service so that the text data on the check is recognized. When calling the API, version information is transmitted to ensure that the web service is a correct web service. When a version indicated by the version information is not supported, an error is reported to the ATM and transmission is reattempted for a predetermined number of times. The method also includes booking the recognized data on the basis of account information determined from a credit card by a magnetic card reader.

13 Claims, 4 Drawing Sheets

(56) References Cited

U.S. PATENT DOCUMENTS

2006/0106717 A1 5/2006 Randle et al.
2008/0137939 A1 6/2008 Wang et al.

OTHER PUBLICATIONS

English translation of Written Opinion of the International Searching Authority (in German) for PCT/EP2010/050258 mailed Mar. 22, 2010 (ISA/EP).
Walsh, Aaron E (Editor): "UDDI, SOAP, and WSDL: The Web Services Specification Reference Book", Prentice Hall PTR, Upper Saddle River, NJ 07458, USA, Jan. 1, 2002, pp. 18-25, XP002495018, ISBN: 978-0-13-085726-2.
Brittenham, Peter: "Understanding WSDL in a UDDI registry, Part 1," Internet Citation [Online] XP002270029: URL: http://www-106.ibm.com/developerworks/library/ws-wsdl1/> [retrieved on Feb. 12, 2012].
Gazitt, O. and Langworthy, D, "WS-Addressing Additions and UPdates," http://msdn.microsoft.com/en-us/library/ms996530.aspx#wsaddressed_topic8 (Apr. 2004).
Srinivasan, R., "RPC: Remote Procedure Call Protocol Specification Version 2," Sun Microsystems, http://tools.ietf.org/html/rfc1831.html, Aug. 1995.

* cited by examiner

Fig. 4

METHOD AND DEVICE FOR DEPOSITING CHECKS

CROSS-REFERENCE TO RELATED APPLICATIONS

This application is a National Stage of International Application No. PCT/EP2009/050258, filed Jan. 12, 2010. This application claims the benefit and priority of European application 09150566.9, filed Jan. 14, 2009. The entire disclosures of the above applications are incorporated herein by reference.

BACKGROUND

This section provides background information related to the present disclosure which is not necessarily prior art.

TECHNICAL FIELD

The invention relates to a method and device for depositing checks. The invention relates specifically to an interface of an ATM to transmit check data information that allows the check to be posted immediately.

DISCUSSION

Today, customer checks can be deposited in check deposit terminals (known as self-service machines or ATMs). The checks are processed without validation, and the customer receives a receipt to the effect that he has deposited the check(s). Until the amount is posted or there is some activity in the account, the checks from the terminals have to be sent to what are known as clearing centers. This is handled over normal mail routes. The consequence is that the amount of the check is not validated and finally posted for several days or weeks.

Publication WO 99/11021 and the entries under Check 21 Act in Wikipedia describe handling of the checks as scanned data. Precise implementation with respect to an ATM is, however, not disclosed.

There exists a plurality of communication protocols in the area of ATMs, such as NDC, DDC, IFX, etc. All these standard protocols do not contain the necessary definitions for an integrated, complete image inspection and processing. Expanding the standard protocols is very challenging and difficult because of the interests of the large number of members. Thus, there is a need for an alternative solution to enable the expansion of the ATMs so that inspecting the image data that normally represent checks is made possible.

SUMMARY OF THE INVENTION

The object An aspect of the present invention is to provide a method and a device, specifically an ATM, that provides an expansion of ATMs in addition to the existing protocols so that in one potential embodiment inspection of image data and their analysis is allowed.

In order to provide inspection of a check in an ATM, the invention is based on the following elements. These elements are
   a clear API (Application Programming Interface) to provide server/host functionality,
   implementation of the API in an open standard technology as a web service.

One possible inventive idea behind it is that ATMs and other inspection devices can integrate the inspection and reading functionality of different CPSs (check processing systems) through a single web service interface. In this way, the host and the client are independent of each other. Implementation of the web service connects the client to the specific CPS system in the individual customer environment. Client and host software do not need to be modified and they continue to be independent of each other.

There are probably as many definitions for web services as there are companies that already provide them, but the numerous definitions have one thing in common:

1. Web services make a useable functionality available to the user over a standard web protocol. In most cases, SOAP (Simple Object Access Protocol) is used as the protocol. It is a network protocol in which data can be exchanged between network systems over RPC (Remote Procedure Calls).

2. Web services provide a path that describes the interface in a sufficient degree of detail so that the user is able to develop a client application that communicates with the web service. This description is normally detailed in an XML document using, for example, Web Services Description Language (WSDL).

3. Web services are registered so that potential user can find them easily. This is usually accomplished using Universal Discovery Description and Integration (UDDI).

One of the primary advantages of the web architecture is that it allows programs to be programmed in different languages and on different platforms but which communicate with each other in a standardized way and exchange information. So they operate with standard web protocols such as XML, HTTP and TCP/IP. A significant number of firms already have a web infrastructure, and consequently knowledge and experience in this area already exists. As a result, the costs for entry into the area of web services are significantly lower than in previous technologies.

This approach allows the customer to drive a multi-vendor strategy in both directions. Web services are a fundamental technology and represent an important evolutionary step in the direction of distributed computing. Open standards and the focus on communication and cooperation between man and applications have created an environment in which web services are becoming the platform for application integration. Applications are developed using several web services from different sources that cooperate regardless of where they are located or how they are implemented.

With this invention, a standardized interface is created in the form of a WEB service containing methods that define the electronic dispatch of checks or transfer records from an ATM to a remote check validation server. At the same time, this interface makes possible online (real time) validation from a check validation server. (Batch inspections using this technology are also conceivable).

An important aspect is the definition of functions and parameters that make a check transaction possible with simultaneous online (real time) posting. This means that the checks deposited by the customer are sent as image data (BMP, JPG or TIF) to a remote validation server and validated immediately while the customer transaction is active. The customer has the immediate opportunity to initiate confirmation of the amount, when the amounts can be posted immediately to the respective accounts. As a result, there is a generally valid interface based on web server technology that allows server and client providers to use this interface to develop a communications logic for online check processing. The advantage is the preselection of functions and data fields that need only to be filled with predefined values. Preselecting functions and data fields allows the client and server application to be developed totally independently.

The result is a number of advantages. One of the advantages, some of which have already been mentioned, is the high degree of independence. As soon as the customers have integrated a clear web service API, they are independent of the host system. On the other hand, it requires no specific device integration effort. As was already mentioned previously, the customer now has the opportunity to select a multi-vendor strategy for clients and a CPS system.

Furthermore, the possibility exists for simple integration into an open standardized environment. In addition to the unique integration of a web service proxy on the client, the primary integration must be seen in implementing the web service itself. Web service implementation realizes the connection between the unique client API and the individual CPS host system. The advantage lies in the fact that web service development can take place in a completely open environment using standard technologies.

Furthermore, no ATM protocol or an expansion of said protocol is required. The expansion of existing protocols has shown that it is often a protracted and difficult process. In addition, the expense would be very great in order to carry out specific CPS solutions for each ATM protocol (.NDC, DDC, IFX, etc.).

Furthermore, no installation of check inspection and reading software on the client (ATM) is necessary. This would normally involve high administration costs since the software would have to be installed on each device and has to be continuously updated and synchronized. Moreover, integration into an ATM software is very specific.

Conversely, maintenance is very simple, the major components run on a central server, web service server or the CPS system or another host system. Scalability and flexibility represent a further advantage, the web service solution makes it possible for the web service to run either on the client (which is not advisable) or on a separate server or on the same server as the CPS system.

HTTPS can be used as the software for secure data transmission, which is well known. Using this approach, it is possible that other image recognition software can also use the interface since it concerns an open standard.

BRIEF DESCRIPTION OF THE DRAWINGS

The drawings described herein are for illustrative purposes only of selected embodiments and not all possible implementations, and are not intended to limit the scope of the present disclosure.

The Figures are described briefly in what follows, where the concrete embodiments must not be understood in a restrictive sense but are intended to provide a better understanding. The scope of protection for the invention is to be determined solely by the claims:

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Parts of the following description of the API web service are described in WSDL notation (reference is made to the fact that a plurality of programming languages can be used, the one employed serves only for an understanding of the example).

When a message is sent between the devices and the service, it is possible that the content is duplicated during the transmission in the network. The result can be that the same message arrives twice at the service. The same phenomenon is possible when the service sends a message to the terminal. For this reason, a MessageID is used that ensures that the same message is not processed twice. Each time that a method is carried out on the service, said method is given a message identifier (ID). This message identification must be unique within the service for all messages so that the device has to construct a unique identifier for each message. The service must receive the message identifiers to ensure that they are unique. In the event that the same message identifier is received by the service for the same method, the service has to/must transmit its original response again. In the event that the same message identifier is received in different methods, the service must confirm that there is a problem and must return an appropriate error code InvalidMessageId. This implies that the service must retain copies of all messages that it receives and sends so that it can validate the incoming messages and reproduce the outgoing messages. The terminal must correspondingly monitor all messages that it sends so that it does not receive duplicate responses. Duplicate responses can be ignored.

A further approach for the present invention is that each time a method is called up, it can be ensured the correct type of service can be used by transmitting information about the version. The terminal should normally integrate the same version values into each call so that the server is able to recognize which version of the method is being used. The version of the method is generally the same as the version of the API itself. The server can thus support different versions of APIs. It has to check the version value in each method call to ensure that the version of the method is supported. In the event that the version is not supported, the service must report an UnsupportedVersion error to the device (SSM/ATM). The maker of the terminal (SSM/ATM) must take into consideration that this error can be applied to each method call) so that the terminal must process these errors accordingly. For example, it is possible to provide two different check deposit services on different servers that respond to method inquiries in a load-distribution scenario. If two methods are routed to different servers by the same device, the version may be acceptable for one server but not for the other. The terminal cannot assume that all methods for one version are always acceptable if only one method call was successful on one occasion. An individual method may have a version value that is different from that of other method calls in the version of API; even if this is an unusual circumstance it should be taken into consideration, but also avoided if at all possible. The version number is determined from primary and sub-extension elements. Based on these tightly structured version numbers, rules can be established that determine whether greater or smaller changes in the versions are involved.

Based on these considerations, several attempts can be made in the event of an error message to carry out the method again or cancelation ensues after a specific number of attempts. In an alternative embodiment, the service can also immediately give up sending further attempts.

Possible methods are shown in the table below.

| METHOD | Description |
| --- | --- |
| GetCapabilities | Determine capabilities of the service |
| StartTransaction | Starts a new check deposit transaction |
| Processitem | Adds a new document to the open transaction. An image is sent to the CPS. |
| Updateitem | Changes the document in the transaction opened. |
| Removeitem | Deletes the document in the transaction opened. |
| CancelTransaction | Cancels the transaction opened. |
| CommitTransaction | Confirms the opens transaction and closes it. |

By means of the GetCapabilities method, the service can be asked which languages are supported, which image data are supported, what type of transactions, how many checks can be transmitted, and so on. The client, or the self-service system, can thus scan the capabilities of the service to control the following method calls correctly. Details about the precise type of scan are omitted here for reasons of arbitrariness and brevity. Someone versed in the art can derive the type of calls from the examples that follow. For example, the StartTransaction method allows the transmission of the following parameters:

| PARAMETER | Description |
| --- | --- |
| MessageId | This pertains to the unique identifier mentioned initially |
| Version | Version of the method used by the device |
| Major | Major version number of the API specification |
| Minor | Minor version number of the API |
| Extension | Optional version number that can be used by agreement |
| LanguageName | Language for messages |
| MachineId | Unique ID for the ATM that ensures that there is only one transaction open for the device. The ID can be made up of different components, such as branch ID, workstation ID, LUNO |
| Account | Determines the account to which the check is to be credited. |
| TransactionType | Deposit, transfer, unknown, Batchdeposit, Batchpayment, Batchunknown |
| TransactionContent | Only checks, credit and checks |
| AdditionalInfo | Additional information |

The terminal, or ATM, transmits the parameters listed above to the service when the method is opened with StartTransaction. The terminal takes the user's language into account and transmits the identifications listed above to a service. In addition, the account number is transmitted, which was normally determined from a card. Additional information that is transmitted is often established in a dialog with the user.

The service in turn evaluates the data transmitted in this manner and, when necessary, sends back error messages if it cannot meet the requirements such as version and language. If all data can be taken into consideration, it sends back StartTransaction as a response, the details of which will not be pursued further at this time since it is constructed quite simply.

The method ProcessItem through which the check data are transmitted from the self-service device to the service is examined below.

| PARAMETER | Description |
| --- | --- |
| MessageId | Unique ID |
| Version | Version see above |
| Major | |
| Minor | |

| PARAMETER | Description |
| --- | --- |
| TransactionID | Unique transaction ID for this transaction |
| Gender | Debit or credit or unknown |
| MicrCodeline | Letters/codeline that were read by the magnetic card reader |
| IncludesSpaces | Note whether there are spaces in the codeline |
| Frontimage | FrontFace view of the check |
| Type | Type of image data |
| | None - no image element |
| | BMP - bitmap |
| | GIF - Graphics Interchange Format |
| | JPEG - JPEG File Interchange Format |
| | JPEG2000 - JPEG2000 |
| | PNG - Portable Network Graphics |
| | TIFF - Tagged Image File Format |
| | WMF - Windows Metafile |
| Image | Base 64-encoded image |
| RearImage | Rear image |
| Type | see above |
| Image | see above |
| CheckDate | Date check issued |
| PostingDate | Date check submitted |
| AdditionalInfo | Additional information |

The description in the table is comprehensible enough that further details are superfluous. What must be taken into account is that both the front side and the back side are transmitted as image data and some additional data such as the time the check was transmitted.

The ATM receives ProcessItem Response as a response.
ProcessItemResponse

| PARAMETER | Description |
| --- | --- |
| Original MessageId | see above |
| Error | Error message regarding the different data that were transmitted |
| ItemId | Unique ID for the document inside the transaction |
| Fields | |
| Gender | Credit or debit |
| Amount | Value of the check |
| Account | Account number of the check |
| SerialNumber | Serial number of the check |
| BankId | Bank code of the issuing bank |
| OpticalRecognitionAmountScore | Value that determines the accuracy of the recognition |
| FundsAvailability | Period of value date |
| CheckDate | Date check issued |
| PostingDate | Transmission date |

This information is also very detailed and allows one skilled in the art to draw a clear conclusion about the sequence.

Figure 2:
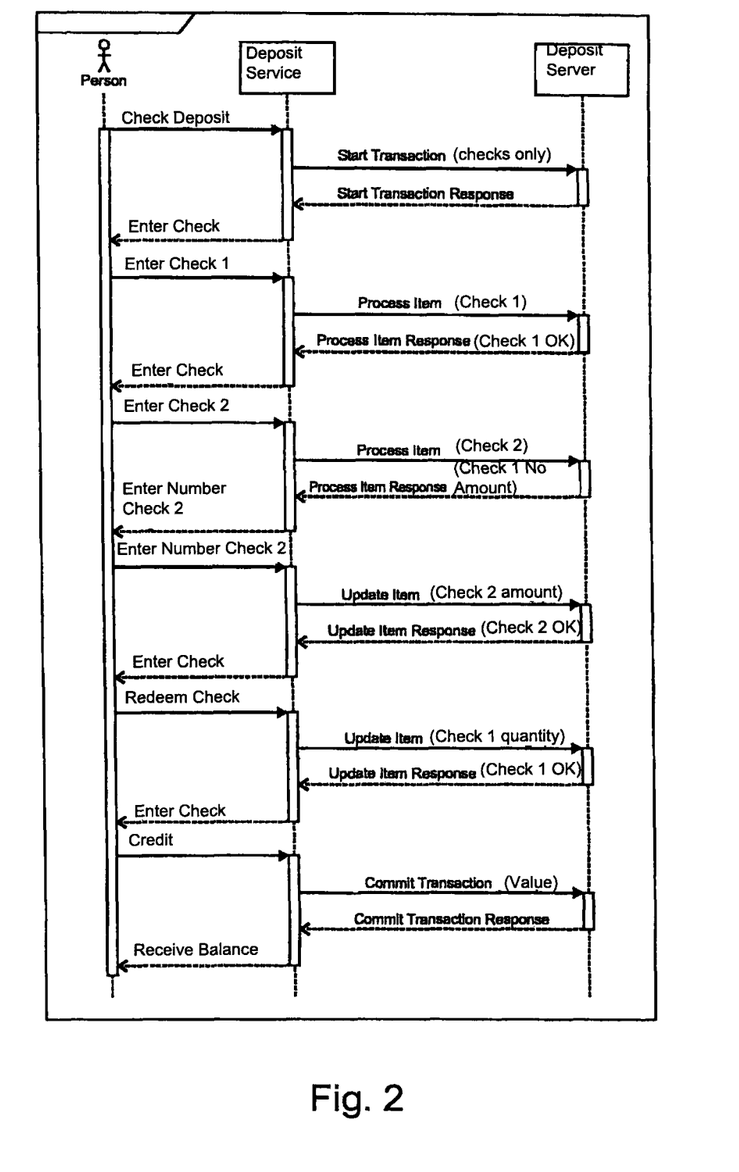
FIG. 2 shows the sequence of the invention in a flow chart.
Figure 3:
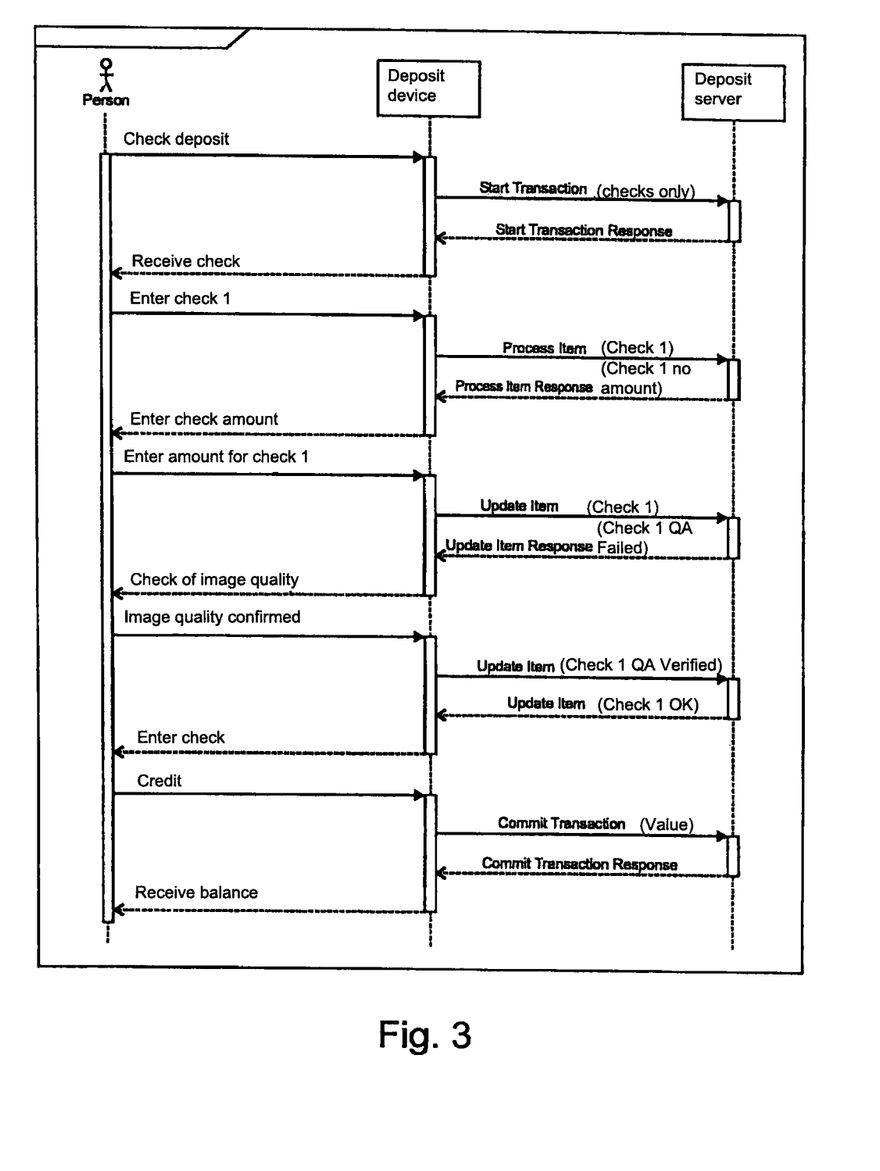
FIG. 3 shows the sequence of inputting a check in accordance with FIG. 2 with several corrections.
Figure 4:
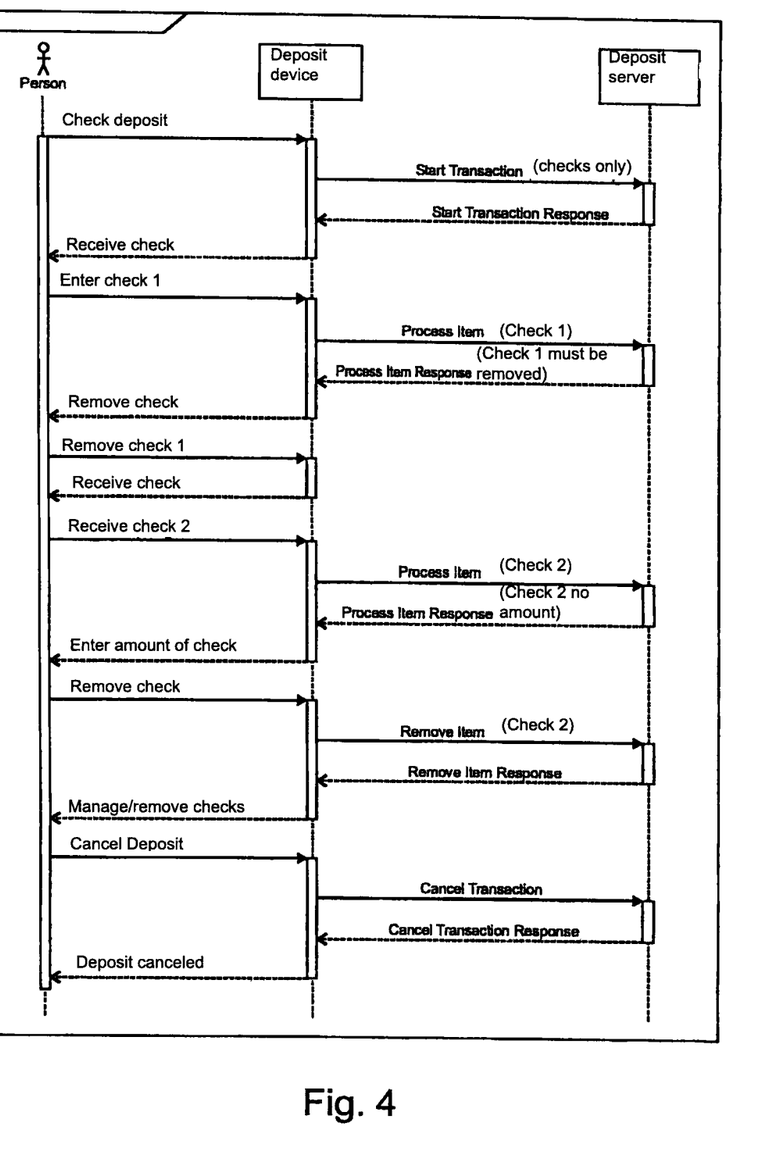
FIG. 4 shows the sequence of the invention with the removal of a check.

FIGS. 2 to 4 show a concrete sequence based on the methods described and their parameters.

FIG. 2 shows that, from an ATM that accepts only checks, the transaction is started by the user carrying out an appropriate dialog. Upon receiving the response from the web service server, the user is requested to insert the check. After the check is inserted, it is processed, and the server transmits that the data sent are correct. The user is now requested in further steps to insert additional checks, when it turns out in the case of the second check that the amount of the check was either missing or was not recognizable. The user is now requested to enter the amount of the check, which is communicated in turn to the web service server. It can further be seen that the user would like to alter the amount of check 1 since said amount was not recognized correctly by the server. After all the data have been imaged, the transaction is concluded and the amount is credited.

FIG. 3 shows a sequence in which several corrections have to be made at the time of insertion. Firstly, the value cannot be recognized so that said value is re-requested manually, secondly, the check's image is not of sufficient quality so that the amount does not agree with the check data. For this reason, the ATM is requested to inspect the image quality of check 1 and to transmit the quality values once more. After this has been done, a credit can be made.

FIG. 4 shows the sequence of a procedure in which two checks are deposited, where the second check is to be removed from the ATM again and not to be credited.

Figure 1:
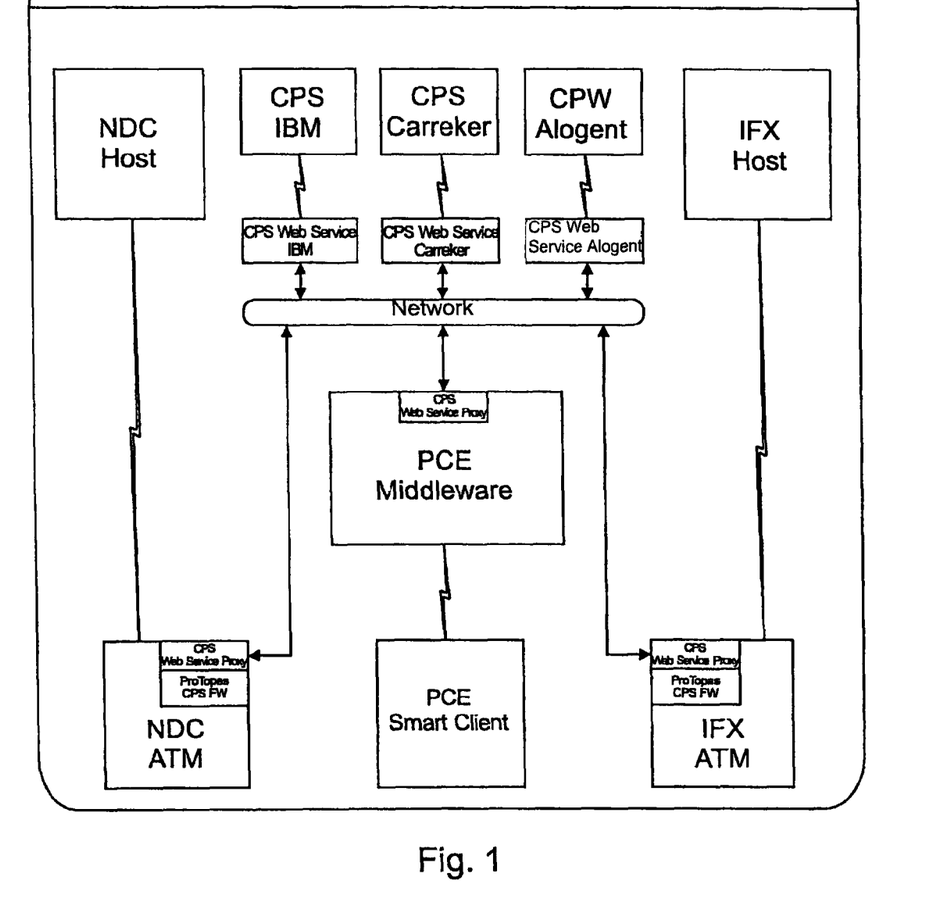
FIG. 1 shows the single structural overview of the invention with different solutions from different manufacturers.

FIG. 1 shows the basic structure of the web service that may be offered by various providers such as IBM, Carreker, Alogent and can communicate with different self-service terminals/ATMs over a network, where a proxy that is installed on the ATM is used for the imaging of the technology inside the ATMs onto that of the web service.

Apache Axis, as well as JWSDP, .NET, etc., can be used to implement the web service.

The service can provide the SOAP-RPC communications model. The API can be described in its entirety in a WSDL file from which the skeleton, or the framework, of the service can be generated automatically that then has to be filled with life through appropriate programming.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for depositing and processing checks using a check deposit terminal (ATM) that has a reading unit to read in image data of a check, the method comprising:
   providing a web service over a network for depositing and processing checks, wherein the web service makes a useable functionality available to a user over a standard web protocol, the web service provides a path that describes an interface that enables the user to develop a client application that communicates with the web service, and the web service is registered so that a potential user can locate the web service;
   capturing the image data of the check with the reading unit of the ATM;
   transmitting the image data to the web service based on an open API (Application Programming Interface) without resorting to standard protocols of ATMs in the field of payment transactions;
   processing the image data with the web service so that the text data on the check is recognized, wherein, when calling the API, version information is transmitted to ensure that the web service is a correct web service, wherein, when a version indicated by the version information is not supported, an error is reported to the ATM, and wherein, when the error is reported, transmission is reattempted for a predetermined number of times;
   conducting a dialog between the web service and the ATM in which the user of the ATM confirms the recognized data from the check;
   booking the recognized data, wherein the recognized data is immediately booked on the basis of account information determined from a credit card by a magnetic card reader.

2. The method according to claim 1, wherein the communication between the web service and the ATM takes place over a proxy that enables imaging to the API.

3. The method according to claim 1, wherein, when the API is opened, the version information is transmitted in order to determine that the correct web service is carried out.

4. The method according to claim 1, wherein calls from the web service are based on RPC (Remote Procedure Calls).

5. The method according to claim 1, wherein a multiple data transmission is captured by unique message identifiers.

6. The method according to claim 5, wherein inquiries and responses are saved in order to answer redundant inquiries and/or to resend said inquiries.

7. A check deposit terminal (ATM) to receive and process checks comprising:
   a reading unit to read in image data of a check,
   a processor providing an open API that allows a connection to a web service that is provided over a network, wherein the web service makes a useable functionality available to a user over a standard web protocol, the web service provides a path that describes an interface that enables the user to develop a client application that communicates with the web service, and the web service is registered so that a potential user can locate the web service,
   wherein the processor is configured to transmit the image data to the web service based on an open API (Application Programming Interface) without resorting to standard protocols in the field of payment transactions, wherein text data on the check is recognized by the web service in order to have the text data booked,
   wherein the processor is configured, when calling the API, to transmit version information to ensure that the web service is a correct web service, wherein, when a version indicated by the version information is not supported, an error is reported to the ATM, and wherein, when the error is reported, transmission is reattempted for a predetermined number of times, wherein a dialog is conducted between the web service and the ATM in which the user of the ATM confirms the recognized data from the check, and wherein the recognized data is immediately booked on the basis of account information determined from a credit card by a magnetic card reader.

8. The ATM according to claim 7, wherein the communication between the web service and the ATM runs over a proxy that enables imaging to the API and is located on the ATM.

9. The ATM according to claim 7, wherein the processing unit is configured in such a manner that a multiple data transmission is captured with unique message identifiers.

10. A web service server for processing checks, image data from said checks having been transmitted by a check deposit terminal (ATM), comprising:
   a network connection to communicate with the ATM in order to acquire the image data;
   a processing unit that provides a web service based on an open API (Application Programming Interface) without resorting to standard protocols of ATMs in the field of financial transactions;
   a unit to initiate booking of text data recognized from the image data;
   wherein the web service makes a useable functionality available to a user over a standard web protocol, the web service provides a path that describes an interface that enables the user to develop a client application that communicates with the web service, the web service is registered so that a potential user can locate the web service, wherein the web service server is configured such that, when calling the API, version information is transmitted by the ATM and received, and when a version indicated by the version information is not supported, an error is reported to the ATM, wherein a dialog is conducted between the web service and the ATM in which the user of the ATM confirms the recognized data from the check, and wherein the recognized data is immediately booked on the basis of account information determined from a credit card by a magnetic card reader.

11. The web service server according to claim 10, wherein the web service server is configured to examine the transmitted version information when the API is opened to determine that a correct web service is performed.

12. The web service server according to claim 10, wherein a multiple data transmission is captured by unique message identifiers (MessageIDs).

13. The web service server according to claim 12, wherein storage means save inquiries and responses, to be able to answer redundant inquiries and/or to resend said inquiries.

* * * * *